March 6, 1951 J. R. BIRD 2,544,550
CAPACITOR
Filed Dec. 31, 1947

INVENTOR
James R. Bird
BY
Evans & McCoy
ATTORNEYS

Patented Mar. 6, 1951

2,544,550

UNITED STATES PATENT OFFICE 2,544,550

CAPACITOR

James R. Bird, Chagrin Falls, Ohio, assignor to Bird Electronic Corporation, Cleveland, Ohio, a corporation of Ohio Application December 31, 1947, Serial No. 794,967

18 Claims. (Cl. 175—41.5)

This invention relates to capacitors for use in electrical circuits, more particularly to relatively small capacitors known as trimmer capacitors especially suitable for use in high frequency applications. The principles of the invention are, however, not so limited and can be employed to advantage in large capacitors and at low frequencies.

In assembling electrical devices employing a large number of capacitors, it is desirable to use small capacitors of from about one mmf. to about 50 mmf. as trimmers. To adjust or tune such circuits the trimmers are varied in capacitance to obtain the desired circuit characteristics. Specific applications are in filters for use at frequencies of from about 30 to about 1500 megacycles per second. Although small in physical size, such capacitors are desirably made to have relatively rugged construction and mechanical rigidity as well as capacitance stability and temperature stability.

It is therefore one of the principal objects of the invention to provide a generally improved capacitor of relatively small physical size and few parts which is simple in design and construction, relatively inexpensive to manufacture, assemble and install which exhibits temperature and capacitance stability, low losses or high Q, and which has improved mechanical strength and rigidity.

Small capacitors of the character mentioned are desirably capable of adjustment so that the circuits in which they are used can be trimmed. Although it is desired to trim or adjust the capacitors, it is also desired that the capacitors retain adjustments so that the circuits remain in trim even though the equipment in which the circuits are employed be subjected to vibrations and shocks. It is therefore another object of the invention to provide a capacitor incorporating simple means for trimming or adjusting the same to vary the capacitance thereof. More specifically, the invention seeks to provide an adjustable trimmer capacitor which holds or retains the adjustment imparted to it and effectively resists variation or misadjustment by jars, vibrations and other shocks.

Another object is to provide a capacitor which includes a relatively large, heavy sectioned member that can be secured directly and rigidly onto a support or panel in mounting the device and which also serves as one terminal of the capacitor.

A still further object is to provide an adjustable or trimmer capacitor having a relatively large maximum-to-minimum capacitance ratio. This feature not only facilitates the tuning of circuits in which the capacitors are employed, but also tends to reduce the number of different capacitors that a manufacturer must stock or supply, thereby reducing manufacturing costs.

Still further objects relating to details of construction and arrangements of parts having advantages of simplicity and economy will become apparent from the following detailed description made in connection with the accompanying drawings forming a part of this specification. Like parts throughout the several views are indicated by the same letters and numerals of reference.

The capacitor includes a dielectric member A which is of suitable insulating material, such as one of the ceramics known in the trade as electrical porcelain, in the form of a circular sectioned cylinder having recesses 1 and 2 in the opposite ends thereof imparting a double cup shape to the member. The recesses are each of circular cross section and are axially aligned. An integral ceramic or insulating partition 3 disposed across the interior of the cylinder separates the end recesses from one another. The fixed "plates" terminals, armatures, or electrodes of the capacitor are in the form of conductive metal coatings 4 and 5, which are sputtered, sprayed or plated in place on the walls of the recesses 1 and 2, silver being a suitable metal.

Figure 1:
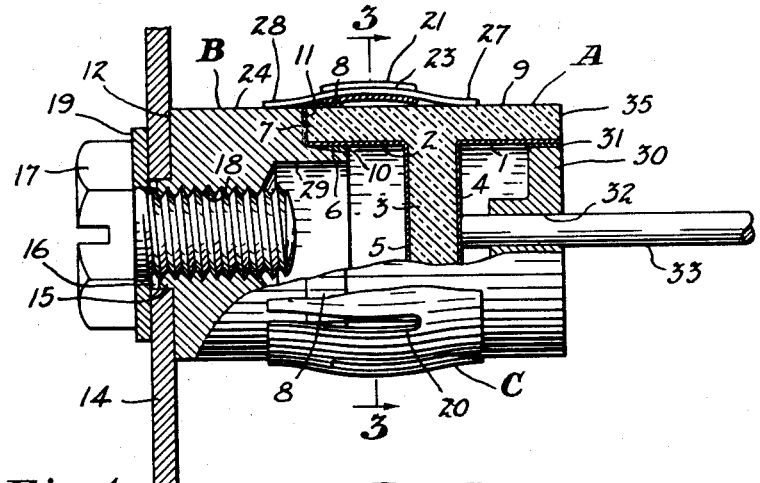
Figure 1 is a side elevational view, partly in section and with parts broken away, showing an adjustable trimmer capacitor mounted on a support which serves as one terminal of the capacitor.
Figure 2:
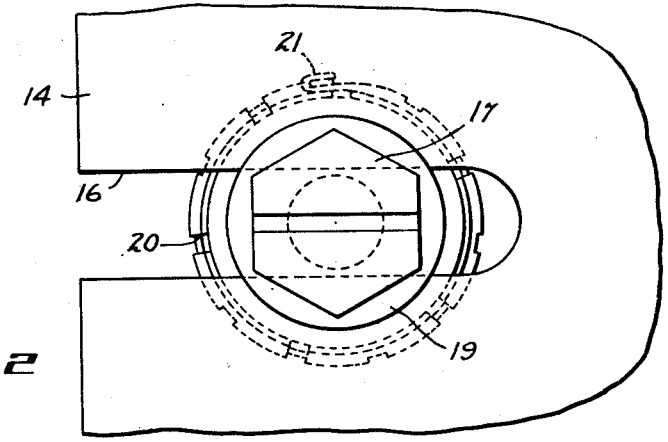
Fig. 2 is an end elevational view of the capacitor and the support therefor.
Figures 3, 4:
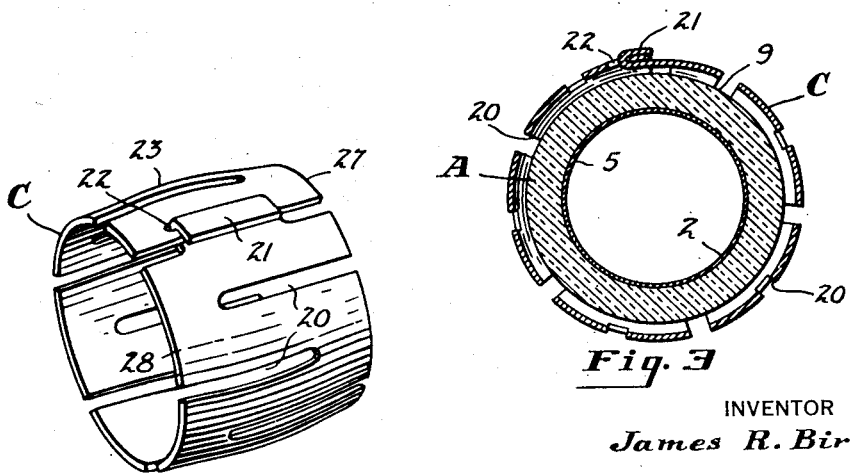
Fig. 3 is a transverse sectional detail, taken substantially on the line indicated at 3—3 of Fig. 1.
Fig. 4 is a perspective view of the expansible and conductive sleeve or collar that embraces the dielectric member of the capacitor and is slidable thereover in trimming or adjusting the capacitance of the device.

A conductive member B is disposed in end to end relation to the dielectric or ceramic member A, preferably having a reduced end portion 6 which is circular in section and is received internally of the recess or cup 2 of the dielectric member A. The conductive member B is formed of metal having high electrical conductivity, such as copper or brass, and is of cylindrical form, preferably having substantially the same outside diameter as the dielectric member A. In assembling the cupped ceramic or dielectric member A on the conductive member B, the reduced diameter portion 6 of the latter acts as a pilot and for this reason is preferably formed with the slight longitudinal taper. Thus, assembly is facilitated and marring or injury of the conductive coating 5 is avoided. As shown in Fig. 1, the conductive coating 5 is preferably carried around end 7 of the dielectric member A and includes a band-like portion 8 on outer cylindrical face 9 of the dielectric member.

Prior to assembly with the dielectric member A the conductive member B is preferably silver plated or tinned. A quantity of solder 10 is then flowed onto the outer face of the reduced end 6, the latter being inserted into the cup or recess 2 while the solder is in a molten condition so that the solder, upon solidifying, adheres to the conductive coating 5 and secures the two members rigidly together in axially aligned relation. In the assembly, end 7 of the dielectric member A, having the conductive metal coating or plating thereover is located by being disposed flatwise or abutted against a circumferentially extending radial shoulder 11 on one end of the conductive member B.

The end of the conductive member B opposite that which is received in the end recess of the dielectric member has a substantially flat end face 12 which is secured against and makes electrical contact with a substantially flat mount or support 14 of conductive material. The mount 14 may be a sheet metal panel or bracket of the apparatus employing the electrical circuit of which the present capacitor is a part. In certain applications, such as high frequency wave filters, it may be convenient to mount a multiplicity of the trimmers or adjustable capacitors of the present invention on a single panel or bracket, the mount or support thus serving as a common conductor which may be the ground of the circuit. To facilitate assembly, the end face 12 of the conductive member B has a centrally disposed raised portion or protuberance 15 extending diametrically across the end of the member. This protuberance is received within a mating slot or opening 16 formed in the mount or support 14, thus serving to locate the capacitor on the panel or mount. The protuberance 15 and the complemental recess or opening 16 therefor have parallel sides or are formed of other noncircular shape so as to prevent relative turning of the capacitor on the panel or support 14. Desirably, the protuberance is in the form of a substantially rectangular slide having parallel sides, and the opening 16 is in the form of an open-ended slot also having parallel sides. A cap screw 17, extending through the slot 16, is threaded into a tapped axial bore 18 in the conductive member B to secure the latter rigidly to the panel or mount 14 in cantilever fashion. A lock washer 19 under the head of the cap screw 17 resists turning of the latter and secures the capacitor in fixed relation on the mount or support.

An adjusting sleeve or collar C is disposed in embracing relation about the dielectric and conductive members A and B. This sleeve is formed of relatively thin spring metal such as beryllium-copper having good electrical properties, including high electrical conductivity. In making the sleeve of thin walled tubing of the material mentioned the stock is cut to length and formed with axial slots 20 which open alternately through the opposite ends of the sleeve or tube length. The collar may also be formed of flat strip stock having a width corresponding to the length of the sleeve, and a length slightly greater than the circumference of the sleeve. The strip is die cut in annealed condition to form the alternating slots 20 and also to form a centrally disposed, bendable tab 21 in one end of the strip and a matching slot 22 to receive the tab in the other end of the strip. The slotted strip is bent to cylindrical form and the tab 21 is inserted through the slot 22 and bent reversely, locking the ends of the strip together. The sleeve is heat treated to impart to it the desired resilient springlike characteristics which cause it to maintain a resilient grip on the cylindrical members A and B of the capacitor, or at least on the conductive member so as to maintain an effective and uniform electrical contact therewith in all positions of adjustment.

As a preferential arrangement and one that has advantages in certain applications of the device, the central portion of the collar may be distended radially providing a circumferentially extending crowned central region, indicated at 23, which is spaced outwardly away from the cylindrical faces 9 and 24 of the members A and B respectively. If the adjusting sleeve is formed from seamless tubing, the crowning may be effected by rolling the sleeve, preferably in an annealed condition, on an internal mandrel. When the sleeve is formed of flat strip stock, the central portion is crowned by passing the strip between formed rollers. The crowning may also be done in a stamping operation which may be the same operation used to form the alternating axial slots 20. By reason of the central crowning of the expansible sleeve, edge portions 27 and 28 thereof strongly grip the cylindrical faces 9 and 24 of the dielectric and conductive members of the capacitor. This positive gripping of the capacitor members by the adjusting sleeve or collar is believed to promote improved capacitance and temperature stability and also to improve the mechanical strength of the device, the collar helping to hold the members together and sharing any stresses tending to separate the parts at the soldered joint 10. The tight gripping of the conductive member B by the edge portions 28 of the adjusting collar is beneficial to the electrical properties of the device since a positive and uniform electrical connection is maintained in all positions of adjustment.

The axial lengths of the capacitor members A and B and the adjusting collar C, while not critical, bear a structural relationship to one another since capacitor adjustment is accomplished by moving the collar axially along the length of the capacitor to a position in which the desired capacitance or electrical characteristic is obtained between, on the one hand, the conductive or silver electrode coating 4 in the recess 1, which constitutes one plate or terminal of the capacitor, and, on the other hand, the conductive or silver coating or electrode 5 in the recess 2, the conductive member B, and the adjusting collar C which together constitute the other plate or terminal of the capacitor. When the adjusting collar or sleeve C is shifted to its extreme limit of movement to the left, as viewed in Fig. 1, the capacitance of the device is at its minimum value. In such position of adjustment the effect of the sleeve or collar C is substantially negligible, the capacitance of the device being about that which it would have if the sleeve or collar were removed.

It is thus apparent that the axial length of the conductive member B is so proportioned that the collar C can be withdrawn substantially completely from the ceramic dielectric member A, or at least to a position in which the edge portions 27 of the adjusting collar are, as viewed in Figure 1, to the left of the plane of that portion of the silver or conductive coating 5 that is across the bottom of the recess 2. As the adjusting collar C is shifted or advanced to the right by a suitable tool, the capacitance of the device progressively increases, maximum capacitance being realized when the adjusting collar is in that position from which further movement would cause the electrical contact between the collar and the cylindrical face 24 of the conductive member B (or the portion 8 of the conductive or silver coating 8) to be broken. Thus, it is desired that the axial length of the insulating or dielectric member A be at least substantially equal to the axial length of the adjusting collar C in order that the device may be made to utilize the full adusting capacity of the sliding collar. The continuous inward spring tension in the adjusting sleeve C maintains a tight grip on the members A and B which holds the sleeve in adjusted position and prevents movement by jarring and shaking.

As the collar C is moved to the right, increasing the capacitance of the device, the surface distance over the insulating dielectric from the free edge 27 of the adjusting collar to the free edge of the conductive or silver coating 4 at the end of the dielectric member A progressively decreases. Maximum voltage rating of the device thus tends to be reduced, as the collar is moved to the right or to maximum capacitance position. It is beneficial, for high voltage applications, to make the dielectric member A of relatively greater axial length than that shown so as to increase the surface leakage distances.

Although the device for most applications employs the conductive or silver coating 5 on the interior of the recess 2, it is satisfactory, in some instances, particularly when a lower minimum capacitance and a more gradual adjustment above minimum capacitance is desired, to omit the conductive electrode coating 5 in one end of the cuplike dielectric member. In such case the members A and B are cemented together. The capacitor terminal or plate then comprises the conductive member B and, if adjustment is provided, the axially slidable collar C.

A circular axial recess or bore 29 formed at the inner end of the conductive member B may be omitted or formed to a different depth than that shown. In the absence of the conductive or silver coating 5, the minimum capacitance of the device varies with the depth of the recess 29, such minimum decreasing as the depth of the recesses increases.

Electrical connection to the conductive or silver coating 4 in the end recess 1 may be effected conventionally, as by soldering a conductor directly thereto, or, preferably, by employing a connector element 30. This element, which may be a brass or copper machine screw product, is in the form of a circular disc or button which has a sliding fit within the silver coating in the end recess and is circumferentially soldered thereto as indicated at 31. A central bore 32 in an axially thickened central portion of the button or element 30 receives a conductor or wire 33 which is soldered in place. Assembly is facilitated by first soldering the connector element 30 on the conductor 31 and then using the conductor or wire as a handle in manipulating the button element to solder the latter to the conductive coating within the end recess of the dielectric member A.

It is desirable, as previously explained, to coat the metal parts, such as the conductive member B, the adjusting collar or sleeve C, and the connector element or button 30 with a plating of tin or silver, preferably the latter. Such coating or plating may be done by electrodeposition or by dipping, electrodeposition being preferred for silver plating.

The outside or cylindrical surface 9 of the dielectric member A and also unplated flat end surface 35 thereof are beneficially treated by applying one or more coats of silicone fluid which penetrates the pores of the ceramic or porcelain material. This treatment stabilizes the capacitance characteristics of the device, particularly under conditions of varying temperature and humidity.

In accordance with the provisions of the patent statutes, the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. A capacitor device for use in an electrical circuit comprising a substantially cylindrical dielectric member having axially aligned recesses in opposite ends and an integral dividing web between the recesses, conductive coatings on the walls of the recesses, a mounting member of conductive material received within one of the recesses and rigidly connected to the conductive coating in such recess to support the dielectric member and to serve as one terminal of the device, screw means threaded into the mounting member for attaching the device to a support, means for making electrical connection with the conductive coating in the other recess, and a conductive element disposed about the conductive and dielectric members and moveable axially thereover in adjusting the capacitance of the device, said element being conductively connected to the mounting member.

2. A capacitor device for use in an electrical circuit comprising a substantially cylindrical dielectric member having axially aligned recesses in opposite ends and an integral dividing web between the recesses, conductive coatings on the walls of the recesses, a mounting member of conductive material received within one of the recesses and rigidly connected to the conductive coating in such recess to support the dielectric member and to serve as one terminal of the device, a substantially circular metal element received substantially wholly within the other recess and soldered to the conductive coating therein to serve as another terminal of the device, means associated with the mounting member for attaching the device to a support, and a conductive element disposed about the conductive and dielectric members and moveable axially thereover in adjusting the capacitance of the device.

3. For use in combination with a conductive mount having a non-circular opening therein, an electrical capacitor comprising a dielectric member having a conductive coating on one end and a conductive member rigidly secured to the other end to serve as a support for the dielectric member and also as one terminal of the capacitor, the conductive member being formed complementally to the mount opening to interfit therein in relative non-rotative relation, means for holding the conductive member and the mount assembled together, means for making electrical connection to the conductive coating, and a thin conductive sleeve embracing the members and making electrical contact with the conductive member, said sleeve being slidable along the members to different positions in which different relative amounts of the members are embraced thereby for adjusting the capacitance of the capacitor.

4. In combination in a device for use in an electrical circuit, a member having a substantially cylindrical portion and a conductive thin metal sleeve of substantially circular section resiliently embracing said portion of the member and slidable axially therealong, the sleeve having a crowned circumferentially extending central portion of greater diameter than the end portions of the sleeve so the end portions maintain relatively tight circumferential grips on spaced zones of the cylindrical portion of the embraced member and an annular clearance is provided between the crowned portion of the sleeve and that area of the cylindrical portion disposed between said spaced zones.

5. In combination in a capacitor of the type having an insulating body and armatures comprising metallic coatings on the body, the improvement which comprises a conductive member of cylindrical shape rigidly joined to the body and in electrical contact with one of the coatings, and a metal adjusting sleeve embracing the cylindrical member, in electrical contact therewith, and slidable axially thereover, the sleeve being movable to different positions in which it substantially surrounds the insulating body and is in substantially circumferential contact with the cylindrical member.

6. In combination with a capacitor of the type having an insulating body and armatures comprising metallic coatings on the body, mounting means comprising a panel having an elongated slot therein, a conductive member rigidly joined to the body and electrically connected to one of the coatings, said member having an end face positioned flatwise against the panel and the end face having a raised portion mating with the slot to restrain relative turning of the member on the panel whereby the member is slidable on the panel longitudinally of the slot with the raised portion guided in the slot, and separable means connected to the member and extending through the slot for holding the member in said position.

7. In combination with a capacitor of the type having an insulating body and armatures comprising metallic coatings on the body, mounting means comprising a panel having an elongated slot therein, a conductive member rigidly joined to the body and electrically connected to one of the coatings, said member having an end face positioned flatwise against the panel and the end face having a raised portion mating with the slot to restrain relative turning of the member on the panel whereby the member is slidable on the panel longitudinally of the slot with the raised portion guided in the slot, and a screw extending through the slot and threaded into the member for holding the member in position on the panel.

8. In combination for use in an electrical circuit, a conductive support and a capacitor device comprising a substantially cylindrical conductive member having one end secured to the support and extending from the support so as to be substantially wholly supported thereby in cantilever fashion, a cylindrical dielectric member of substantially the same diameter as the conductive member disposed in end to end relation to and substantially wholly supported by the latter, said dielectric member having a closed bottom recess in its end opposite the conductive member, a thin sectioned conductive metal coating on the walls of the recess, means making electrical contact with the coating for connecting the device in an electrical circuit, and a conductive sleeve embracing both the conductive and dielectric members and wholly supported by such members for longitudinal adjustment thereon.

9. In combination for use in an electrical circuit, a conductive support and a capacitor device comprising a substantially cylindrical conductive member having one end secured to the support and extending from the support so as to be substantially wholly supported thereby in cantilever fashion, a cylindrical dielectric member of substantially the same diameter as the conductive member disposed in end to end relation to and substantially wholly supported by the latter, said dielectric member having a closed bottom recess in its end opposite the conductive member, a thin sectioned conductive metal coating on the walls of the recess, means making electrical contact with the coating for connecting the device in an electrical circuit, and a resilient expansible sleeve of conductive character embracing both the conductive and dielectric members and wholly supported thereby, said sleeve being slidable along the members to different positions of adjustment and being in conductive electrical contact with the conductive member in all positions of adjustment.

10. In combination for use in an electrical circuit, a conductive support and a capacitor device comprising a substantially cylindrical conductive member having one end secured to the support and extending from the support so as to be substantially wholly supported thereby in cantilever fashion, a cylindrical dielectric member of substantially the same diameter as the conductive member disposed in end to end relation to and substantially wholly supported by the latter, said dielectric member having a closed bottom recess in its end opposite the conductive member, a thin sectioned conductive metal coating on the walls of the recess, means making electrical contact with the coating for connecting the device in an electrical circuit, and an expansible metal sleeve resiliently embracing both the conductive and dielectric members and wholly supported thereby, said sleeve being adjustable axially by sliding and being in conductive electrical contact with the conductive member in all positions of adjustment.

11. In combination for use in an electrical circuit, a conductive support and a capacitor device comprising a substantially cylindrical conductive member having one end secured to the support and extending from the support so as to be substantially wholly supported thereby in cantilever fashion, a cylindrical dielectric member of substantially the same diameter as the conductive member disposed in end to end relation to and substantially wholly supported by the latter, said dielectric member having closed bottom recesses in its ends, thin sectioned conductive metal coatings on the walls of the recesses, the conductive member being electrically connected to one of the coatings, means making electrical connection with another of the coatings for connecting the device in an electrical circuit, and a conductive sleeve embracing both the conductive and dielectric members and wholly supported by such members for longitudinal adjustment thereon.

12. In combination for use in an electrical circuit, a conductive support and a capacitor device comprising a substantially cylindrical conductive member having one end secured to the support and extending from the support so as to be substantially wholly supported thereby in cantilever fashion, a cylindrical dielectric member of substantially the same diameter as the conductive member disposed in end to end relation to and substantially wholly supported by the latter, said dielectric member having closed bottom recesses in its ends and the conductive member including a reduced diameter extension received within one of the end recesses, a thin sectioned conductive metal coating on the walls of the other end recess, means making electrical contact with the coating for connecting the device in an electrical circuit, and a conductive sleeve embracing both the conductive and dielectric members and wholly supported by such members for longitudinal adjustment thereon.

13. In combination for use in an electrical circuit, a conductive support having an aperture therethrough and a capacitor device mounted on and substantially wholly supported thereby in cantilever fashion, the device comprising a substantially cylindrical conductive member having an end face disposed against one side of the support and having an integral extension projecting into the support aperture to locate the device in predetermined position on the support, a cylindrical dielectric member of substantially the same diameter as the conductive member disposed in end to end relation to and substantially wholly supported by the latter, said dielectric member having a closed bottom recess in its end opposite the conductive member, a thin sectioned conductive metal coating on the walls of the recess, means making electrical contact with the coating for connecting the device in an electrical circuit, and a conductive sleeve embracing both the conductive and dielectric members and wholly supported by such members for longitudinal adjustment thereon.

14. In combination for use in an electrical circuit, a conductive support having an aperture therethrough and a capacitor device mounted on and substantially wholly supported thereby in cantilever fashion, the device comprising a substantially cylindrical conductive member having an end face disposed against one side of the support and having an integral extension projecting into the support aperture to locate the device in predetermined position on the support, screw means extending into the conductive member from the other side of the support to retain the device in said position, a cylindrical dielectric member of substantially the same diameter as the conductive member disposed in end to end relation to and substantially wholly supported by the latter, said dielectric member having a closed bottom recess in its end opposite the conductive member, a thin sectioned conductive metal coating on the walls of the recess, means making electrical contact with the coating for connecting the device in an electrical circuit, and a conductive sleeve embracing both the conductive and dielectric members and wholly supported by such members for longitudinal adjustment thereon.

15. In a device for use in an electrical circuit, the combination of a pair of cylindrical members disposed substantially in axially aligned end to end relation and a resilient circumferentially expansible tubular conductive sleeve of thin metal surrounding and slidable axially of cylindrical portions of the adjacent ends of said members and resiliently embracing at least one of the surrounded cylindrical portions.

16. In a device for use in an electrical circuit, the combination of a pair of cylindrical members disposed substantially in axially aligned end to end relation and a resilient circumferentially expansible circular sectioned conductive sleeve of thin metal surrounding and slidable axially of cylindrical portions of the adjacent ends of said members and resiliently embracing at least one of the surrounded cylindrical portions, the sleeve being of greater diameter across its central portion than across at least one end marginal portion thereof to provide for positive circumferential contact of one end portion against the surface of the member embraced thereby.

17. In a device for use in an electrical circuit, the combination of a pair of cylindrical members disposed substantially in axially aligned end to end relation and a cylindrical conductive sleeve of resilient thin metal surrounding and slidable axially of cylindrical portions of the adjacent ends of said members and resiliently embracing at least one of the surrounded cylindrical portions, the sleeve being formed with a series of circumferentially spaced axial slits opening alternately through opposite ends to provide for circumferential expansion of the sleeve and being of greater diameter across its central portion than across at least one end marginal portion thereof to provide for positive circumferential gripping contact of the one end portion of the sleeve against the surface of the cylindrical portion of the member embraced thereby.

18. In combination in a device for use in an electrical circuit, members having cylindrical end portions of substantially equal diameter abutted together in axial alignment, and a substantially circular sectioned resilient circumferentially expansible conductive sleeve surrounding the cylindrical end portions and resiliently embracing at least one of them, the sleeve having a reduced diameter portion of relatively short longitudinal extend contacting the cylindrical end portion of said one member.

JAMES R. BIRD.

REFERENCES CITED

The following references are of record in the file of this patent:

UNITED STATES PATENTS

| Number | Name | Date |
|---|---|---|
| 1,797,878 | Palm | Mar. 24, 1931 |
| 1,871,839 | Carter | Aug. 16, 1932 |
| 2,149,702 | Maris | Mar. 7, 1939 |
| 2,272,060 | Dow | Feb. 3, 1942 |
| 2,277,968 | Godsey | Mar. 31, 1942 |
| 2,407,359 | White | Sept. 10, 1946 |
| 2,412,081 | Droll | Dec. 3, 1946 |
| 2,451,201 | Clark | Oct. 12, 1948 |

FOREIGN PATENTS

| Number | Country | Date |
|---|---|---|
| 452,016 | Great Britain | Aug. 14, 1936 |
| 523,869 | Great Britain | July 24, 1940 |
| 68,576 | Norway | Nov. 13, 1944 |